(12) United States Patent
Chen et al.

(10) Patent No.: US 11,978,116 B2
(45) Date of Patent: May 7, 2024

(54) DATA DISPLAY METHOD AND APPARATUS, TERMINAL DEVICE, AND STORAGE MEDIUM

(71) Applicant: SHENZHEN FUTU NETWORK TECHNOLOGY CO., LTD., Guangdong (CN)

(72) Inventors: Hanbin Chen, Guangdong (CN); Kun Zhong, Guangdong (CN); Congling Cao, Guangdong (CN)

(73) Assignee: SHENZHEN FUTU NETWORK TECHNOLOGY CO., LTD., Shenzhen (CN)

(*) Notice: Subject to any disclaimer, the term of this patent is extended or adjusted under 35 U.S.C. 154(b) by 85 days.

(21) Appl. No.: 17/562,012

(22) Filed: Dec. 27, 2021

(65) Prior Publication Data

US 2022/0122178 A1 Apr. 21, 2022

Related U.S. Application Data

(63) Continuation of application No. PCT/CN2021/104773, filed on Jul. 6, 2021.

(30) Foreign Application Priority Data

Jul. 8, 2020 (CN) .......................... 202010653088.2

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
USPC .......................................................... 705/37
See application file for complete search history.

(56) References Cited

U.S. PATENT DOCUMENTS

| 2011/0270763 A1* | 11/2011 | Graham, III | ....... G06Q 20/3829 |
| | | | 705/71 |
| 2013/0097053 A1* | 4/2013 | Lee | .................... G06Q 30/0282 |
| | | | 705/26.7 |

FOREIGN PATENT DOCUMENTS

| CN | 102333067 A | 1/2012 |
| CN | 102915307 A | 2/2013 |
| CN | 105243169 A | 1/2016 |

(Continued)

OTHER PUBLICATIONS

The First Office Action in counterpart China Application No. 202010653088.2, dated May 10, 2023.

(Continued)

*Primary Examiner* — Matthew S Gart
*Assistant Examiner* — Liz P Nguyen

(57) ABSTRACT

The present disclosure provides a data display method and apparatus, a terminal device, and a storage medium. The method includes: transmitting, by a terminal device, a transaction note request of a target user to a server; receiving a transaction note file fed back by the server, the transaction note file being generated by the server based on transaction note data after the server performs an identity authentication on the target user based on the transaction note request and searches a predetermined security domain database for the transaction note data in response to a successful identity authentication; and displaying transaction note data in the transaction note file.

16 Claims, 4 Drawing Sheets

(56) References Cited

FOREIGN PATENT DOCUMENTS

| CN | 107368552 | A |   | 11/2017 | |
|---|---|---|---|---|---|
| CN | 107481114 | A |   | 12/2017 | |
| CN | 108288226 | A |   | 7/2018 | |
| CN | 108399565 | A |   | 8/2018 | |
| CN | 109064255 | A |   | 12/2018 | |
| CN | 10963661 |   | * | 4/2019 | ............ G06Q 40/06 |
| CN | 109766142 | A |   | 5/2019 | |
| CN | 109859004 | A |   | 6/2019 | |
| CN | 109976754 | A |   | 7/2019 | |
| CN | 110083319 | A |   | 8/2019 | |
| CN | 110225104 | A |   | 9/2019 | |
| CN | 110471900 | A |   | 11/2019 | |
| CN | 110489691 | A |   | 11/2019 | |
| CN | 110826080 | A |   | 2/2020 | |
| CN | 110942385 | A |   | 3/2020 | |
| CN | 110990096 | A |   | 4/2020 | |
| CN | 111192161 | A |   | 5/2020 | |
| CN | 111858686 | A |   | 10/2020 | |

OTHER PUBLICATIONS

The Second Office Action in counterpart China Application No. 202010653088.2, dated Nov. 22, 2023.

* cited by examiner

DATA DISPLAY METHOD AND APPARATUS, TERMINAL DEVICE, AND STORAGE MEDIUM

CROSS-REFERENCE TO RELATED APPLICATION

This application is a continuation of International Application No. PCT/CN2021/104773, filed on Jul. 6, 2021, which claims priority to Chinese patent application No. 202010653088.2 with the title "DATA DISPLAY METHOD AND APPARATUS, TERMINAL DEVICE, AND STORAGE MEDIUM", filed by SHENZHEN FUTU NETWORK TECHNOLOGY CO., LTD. on Jul. 8, 2020. The disclosures of the aforementioned applications are hereby incorporated by reference in their entireties.

FIELD

The present disclosure relates to the field of computer technology, and in particular to a data display method, a data display apparatus, a terminal device, and a storage medium.

BACKGROUND

In a stock transaction system, a stock transaction record will be generated after a user conducts a stock transaction. If the user wants to review and summarize his/her own stock transaction after conducting the stock transaction, he/she generally needs to manually search for and pick up the transaction record from respective transactions. This costs the user much time and requires cumbersome operations.

SUMMARY

Embodiments of the present disclosure provide a data display method, a data display apparatus, a terminal device, and a storage medium, which can improve data search efficiency.

In a first aspect of the embodiments of the present disclosure, a data display method is provided. The data display method is applied in a terminal device. The method includes: transmitting a transaction note request of a target user to a server; receiving a transaction note file fed back by the server, the transaction note file being generated by the server based on transaction note data after the server performs an identity authentication on the target user based on the transaction note request and searches a predetermined security domain database for the transaction note data in response to a successful identity authentication; and displaying transaction note data in the transaction note file.

In a second aspect of the embodiments of the present disclosure, a data display apparatus is provided. The data display apparatus is applied in a terminal device. The apparatus includes a transmitting unit, a receiving unit and a display unit. The transmitting unit is configured to transmit a transaction note request of a target user to a server. The receiving unit is configured to receive a transaction note file fed back by the server. The transaction note file is generated by the server based on transaction note data, after the server performs an identity verification on the target user based on the transaction note request and searches a predetermined security domain database for the transaction note data in response to a successful identity authentication. The display unit is configured to display transaction note data in the transaction note file.

In a third aspect of the embodiments of the present disclosure, a terminal device is provided. The terminal device includes a processor, a memory, a communication interface, and one or more programs. The programs are stored in the memory and configured to be executed by the processor. The programs include instructions configured to implement steps in the first aspect of the embodiments of the present disclosure.

In a fourth aspect of embodiments of the present disclosure, a computer-readable storage medium is provided. The computer-readable storage medium is configured to store a computer program. The computer program causes a computer to execute instructions for implementing some or all of the steps in the first aspect of the embodiments of the present disclosure.

In a fifth aspect of the embodiments of the present disclosure, a computer program product is provided. The computer program product includes a non-transitory computer-readable storage medium having a computer program stored thereon. The computer program is operable to cause a computer to execute some or all of the steps in the first aspect the embodiments of the present disclosure. The computer program product may be a software installation package.

In the data display method and apparatus, the terminal device and the storage medium described in the embodiments of this disclosure, a transaction note request of a target user is transmitted to a server through a terminal device; a transaction note file fed back by the server is received, the transaction note file being generated by the server based on transaction note data after the server performs an identity authentication on the target user based on the transaction note request and searches a predetermined security domain database for the transaction note data in response to a successful identity authentication; and transaction note data in the transaction note file is displayed. In this way, the terminal device can generate and display transaction note data based on transaction data. In addition, a user is enabled to review and summarize a transaction based on the transaction note data.

BRIEF DESCRIPTION OF DRAWINGS

In order to more clearly describe technical solutions in the embodiments of the present disclosure, drawings used in the embodiments are briefly described below. Obviously, the drawings as described below are merely some embodiments of the present disclosure. Based on these drawings, other drawings can be obtained by those skilled in the art without creative effort.

DESCRIPTION OF EMBODIMENTS

The technical solutions in the embodiments of the present disclosure will be described clearly and fully with reference to the accompanying drawings in the embodiments of the present disclosure. Obviously, the described embodiments are part rather than all of the embodiments of the present disclosure. Based on the embodiments in the present disclosure, all other embodiments obtained by those of ordinary skill in the art without creative work shall fall within the protection scope of the present disclosure.

Terms such as "first", "second", "third", and "fourth" in the specification, the claims and the drawings of the present disclosure are used to distinguish different objects, not to describe a specific order. In addition, the terms "including" and "having" and any variation thereof are intended to cover non-exclusive inclusions. For example, a process, a method, a system, a product, or a device that includes a series of steps or units is not limited to the listed steps or units, but optionally further includes unlisted steps or units or optionally further includes other steps or units inherent to the process, the method, the product or the device.

Reference herein to "embodiment" means that a specific feature, structure, or characteristic described in conjunction with the embodiment may be included in at least one embodiment of the present disclosure. The appearances of this phrase in various places of the specification do not necessarily refer to the same embodiment, nor are independent or alternative embodiments mutually exclusive of other embodiments. Those skilled in the art explicitly and implicitly understand that the embodiments described herein can be combined with other embodiments.

A terminal device described in the embodiments of this disclosure may include but is not limited to a smart phone (such as an Android phone, an iOS phone, a Windows phone, etc.), a driving recorder, a tablet computer, a video matrix, a monitoring platform, a handheld computer, a notebook computer, a mobile Internet device (MID) or a wearable device, etc., which are given only as examples and are not exhaustively listed.

Figure 1:
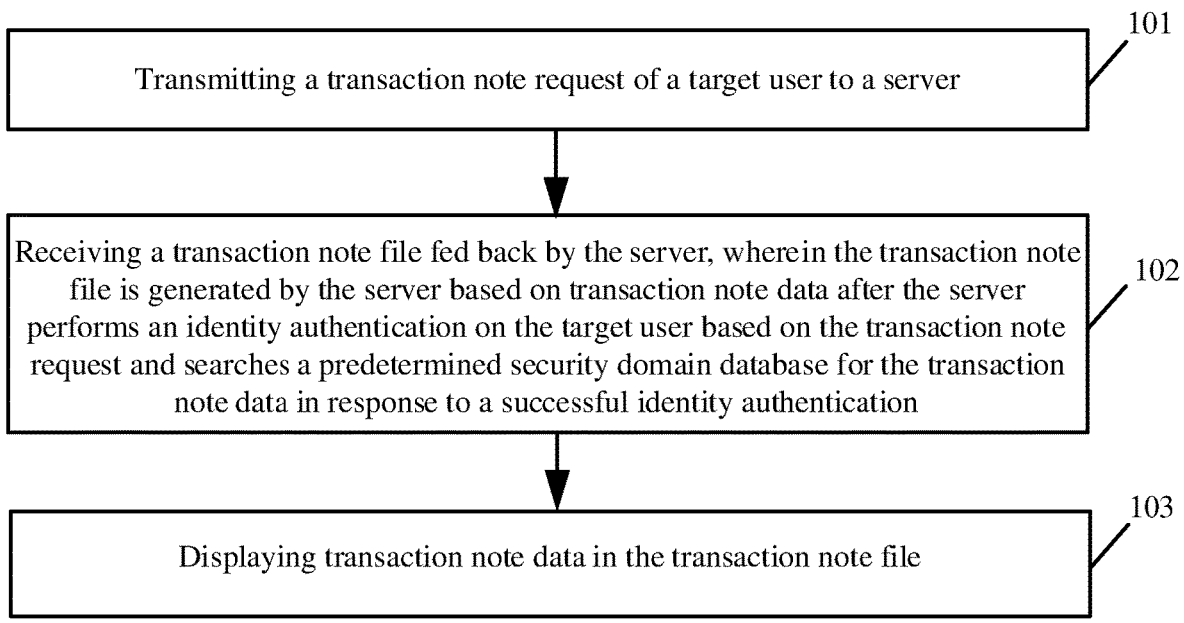
FIG. 1 is a schematic flowchart of a data display method according to an embodiment of the present disclosure.

FIG. 1 is a schematic flowchart of a data display method according to an embodiment of the present disclosure. The data display method according to the embodiment is applied in a terminal device, and the method includes the following steps.

At step 101, a transaction note request of a target user is transmitted to a server.

When a user uses a stock trading application on the terminal device, the terminal device can transmit the transaction note request of the target user to the server, instructing the server to transmit a transaction note file pre-stored in the server to the terminal device.

Optionally, prior to step 101, the method further includes the following steps.

At step 11, a transaction data range of the target user is obtained.

At step 12, stock transaction data of the target user is collected based on the transaction data range. The stock transaction data is transaction data generated by a stock transaction of the target user.

At step 13, transaction note data is generated based on the stock transaction data.

At step 14, the transaction note data is transmitted to the server. The transaction note data is stored by the server in a security domain database after the server performs an identity authentication on the target user.

The transaction data range can be set by the user or can be set by default by a system, which is not limited by the embodiments of the disclosure. Specifically, the transaction data range can be a transaction time range, so that stock transaction data within a predetermined transaction time range can be obtained. The transaction data range may also include a stock target range, so that required stock transaction data can be obtained based on a predetermined stock target range to generate a transaction note.

The stock transaction data may include at least one of the following: stock transaction information, stock run chart information, scoring and evaluation information of the target user regarding the stock transaction, like and comment information of the target user regarding the stock transaction. The stock transaction information may specifically include at least one of the following: a stock name, a stock code, a buy/sell direction, a price, a quantity, a transaction time, etc.

Optionally, generating the transaction note data based on the stock transaction data includes: extracting key transaction data of a predetermined type from the stock transaction data as the transaction note data.

Optionally, extracting the key transaction data of the predetermined type from the stock transaction data as the transaction note data further includes: performing a statistic analysis, calculation, or merging operation on the key transaction data to obtain the transaction note data.

Specifically, generating the transaction note data based on the stock transaction data can be extracting the key transaction data of the predetermined type from the stock transaction data as the transaction note data and additionally performing the statistic analysis, calculation, or merging operation on the key transaction data to obtain the transaction note data.

In a specific implementation, when the target user performs a predetermined transaction, such as stagging, liquidating, etc., on the terminal device, the terminal device can generate the transaction note data based on the stock transaction data. For example, when the target user performs stagging, the terminal device can generate based on the stock transaction data the following transaction note data: initial public offerings (IPO) issuance information, a stagging record, a transaction record of selling stagged shares, etc. When the target user performs liquidating, the terminal device can generate based on the stock transaction data the following transaction note data: a general market performance review, a liquidated-stock performance review, a liquidated-stock transaction record, etc. Or, when a predetermined time trigger condition is met, the terminal device can generate the transaction note data based on the stock transaction data. An electronic device can set a time node which can be a daily closing time, a weekly closing time, a monthly closing time, a quarterly closing time, an annual closing time, etc. When an actual time reaches the time node, the terminal device can generate based on the stock transaction data the following transaction note data: a daily closing summary, a quarterly transaction summary, an annual transaction summary, etc. For example, the daily closing summary may specifically include the following transaction note data: a general market performance review, profit and loss data of a current day, position data of a current day, transaction order data, etc. The annual transaction summary can specifically include the following transaction note data: a general market performance review of a year, profit and loss data of a year, position statistics, transaction statistics, etc.

Optionally, subsequent to collecting the stock transaction data of the target user based on the transaction data range, the method further includes the following steps.

At step 15, scoring and evaluation information of scoring and evaluation performed by the target user on the stock transaction and comment information of commenting performed by the target user on the stock transaction are collected.

At step 16, the transaction note data is generated, based on the stock transaction data, the scoring and evaluation information, and the comment information.

The scoring and evaluation information and the comment information of the target user can also be used as a component of the transaction note data, so that the scoring and evaluation information and the comment information for the stock transaction can be displayed in the transaction note.

Optionally, the transaction data range includes a transaction time range and a stock target range. The step 12 of collecting the stock transaction data of the target user based on the transaction data range includes the following steps.

At step 1201, transaction data generated by a stock transaction of the target user within the transaction time range is obtained.

At step 1202, a run chart related to the stock transaction in the stock target range is obtained from a stock transaction system.

The terminal device can obtain the transaction data generated by the stock transaction of the target user within the transaction time range, as well as the run chart related to the stock transaction in the stock target range, for example, a stock run chart on a stock details page, a general market run chart, etc. In this way, the run chart related to the stock transaction can be automatically obtained to generate the transaction note data related to the stock transaction, without requiring the user to manually search from various transaction data and select the run chart.

At step 102, a transaction note file fed back by the server is received. The transaction note file is generated by the server based on transaction note data, after the server performs an identity authentication on the target user based on the transaction note request and searches a predetermined security domain database for the transaction note data in response to a successful identity authentication.

The server may transmit the transaction note file in the predetermined security domain database to the terminal device. The server may pre-store the transaction note file in the security domain database of the server to ensure the security of the transaction note data.

At step 103, transaction note data in the transaction note file is displayed.

The above-mentioned transaction note file may include at least one of the following transaction note sub-file: a closing note sub-file, a liquidating note sub-file, a stagging note sub-file, a quarter note sub-file, an annual note sub-file, etc. The closing note sub-file may include the following transaction note data: a general market performance review, profit and loss data of a current day, position data of a current day, transaction order data, etc. The liquidating note sub-file can include the following transaction note data: a general market performance review, a liquidated-stock performance review, a liquidated-stock transaction record, etc. The stagging note sub-file may include the following transaction note data: IPO issuance information, a stagging transaction record, a transaction record of selling stagged shares, etc. The annual note sub-file may include the following transaction note data: a general market performance review of a year, profit and loss data of a year, position statistics, transaction statistics, etc.

In a specific implementation, after receiving the transaction note file, the terminal device parses the transaction note file to obtain the transaction note data, and then displays the transaction note data on a user display interface of the terminal device, so that the user can review and summarize the transaction that has occurred based on the transaction note data.

Optionally, the transaction note file includes at least one transaction note sub-file, and each of the at least one transaction note sub-file includes at least one note module. The step 103 of displaying the transaction note data in the transaction note file includes the following steps.

At step 31, at least one group of same-type note modules in the at least one transaction note sub-file are determined. The same-type note modules include note modules of a same type from different transaction note sub-files.

At step 32, a first control type is determined based on a data type of the same-type note modules.

At step 33, view controls corresponding to the same-type note modules are added based on a view control template corresponding to the first control type.

At step 34, a second control type is determined based on a data type of a non-same-type note module in the at least one transaction note sub-file other than the at least one group of same-type note modules.

At step 35, a view control corresponding to the non-same note module is added based on the second control type.

At step 36, filled view controls are obtained, by filling note data corresponding to the same-type note modules to the view controls corresponding to the same-type note modules based on a filling order corresponding to the same-type note modules and filling note data corresponding to the non-same-type note module to the view control corresponding to the non-same-type note module.

At step 37, a transaction note view is generated based on the filled view controls, and the transaction note view is displayed on a user interface.

The above note module may include at least one of the following: market performance information (for example, a daily general market performance review, a general market performance review at a stage, and an annual general market performance review), account profit and loss (profit and loss of a current day, profit and loss at a stage, annual profit and loss), position statistics, position details, transaction statistics, transaction details, IPO information, a stagging record, etc., which is not limited herein.

The daily general market performance review, the general market performance review at a stage, and the annual general market performance review belong to same-type note modules; the profit and loss data of the current day, the profit and loss data at a stage, and the annual profit and loss data belong to same-type note modules; the daily transaction statistics, the stagging transaction statistics, and the annual transaction statistics belong to same-type note modules; and the daily transaction details, the stagging transaction details, and the annual transaction details belong to same-type note modules. Therefore, the same-type note modules in the at least one transaction note sub-file can be analyzed to obtain the at least one group of same-type note modules.

The terminal device can set a corresponding view control template for each control type. In this way, the same view control template can be applied to at least one same-type note module belonging to a group of same-type note modules, thereby improving the compatibility of the view control template in different transaction note sub-files.

The above-mentioned filling order refers to a filling sequence between transaction note data in a note module and transaction note data in other note modules. For at least one group of same-type note modules, the filling sequence of at least one transaction note data corresponding to the same-type note modules can be set to be the same, so that when note data of a same type is called from the database, storage addresses are accessed in a fixed sequence, thereby improving the efficiency of filling the note data.

Optionally, the step 37 of generating the transaction note view based on the at least one filled view control includes the following steps.

At step 3701, at least one filled view control corresponding to at least one same-type note module of the at least one transaction note sub-file are stitched in accordance with a same positional relation.

At step 3702, the filled view control corresponding to the non-same-type note module is stitched with at least one stitched view control corresponding to at least one same-type note module belonging to a same transaction note sub-file, to obtain the transaction note view.

The above-mentioned positional relation refers to a positional relation between same-type note modules included in a transaction note sub-file. By stitching at least one filled view control corresponding to at least one same-type note module in each of the at least one transaction note sub-file in accordance with the same position relation, data of the same-type note modules can have the same positional relation in different display areas, thereby improving the stability of the display effect of note data.

By first stitching at least one filled view control corresponding to at least one same-type note module and then stitching filled view controls corresponding to other note modules with the at least one stitched view control, the stability of positions where the same-type note modules are stitched can be guaranteed, thereby improving the display effect of the note data.

As can be seen from the above, with the data display method described in the embodiments of the present disclosure, the transaction note request of the target user is transmitted to the server through the terminal device; the transaction note file fed back by the server is received, the transaction note file being generated by the server based on the transaction note data after the server performs the identity authentication on the target user based on the transaction note request and searches the predetermined security domain database for the transaction note data in response to the successful identity authentication; and the transaction note data in the transaction note file is displayed. In this way, the terminal device can generate and display transaction note data based on transaction data. In addition, the user is enabled to review and summarize a transaction based on the transaction note data.

Figure 2:
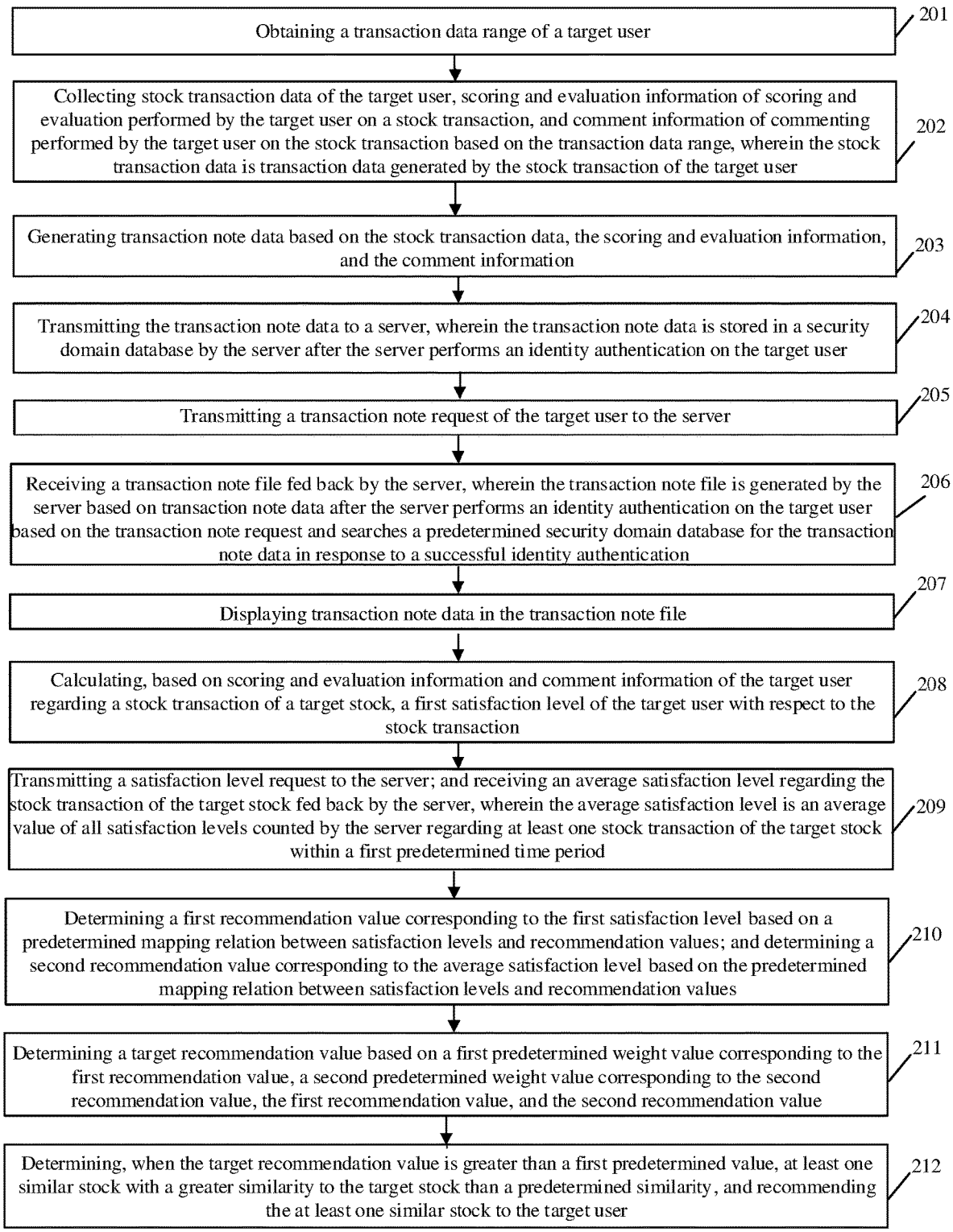
FIG. 2 is a schematic flowchart of a data display method according to an embodiment of the present disclosure.

Consistent with the above, FIG. 2A is a schematic flowchart of a data display method according to an embodiment of the present disclosure. The data display method according to the embodiment is applied in a terminal device and includes the following steps.

At step 201, a transaction data range of a target user is obtained.

At step 202, stock transaction data of the target user, scoring and evaluation information of scoring and evaluation performed by the target user on a stock transaction, and comment information of commenting performed by the target user on the stock transaction are collected based on the transaction data range. The stock transaction data is transaction data generated by the stock transaction of the target user.

At step 203, transaction note data is generated based on the stock transaction data, the scoring and evaluation information, and the comment information.

At step 204, the transaction note data is transmitted to a server. The transaction note data is stored in a security domain database by the server after the server performs an identity authentication on the target user.

At step 205, a transaction note request of the target user is transmitted to the server.

At step 206, a transaction note file fed back by the server is received. The transaction note file is generated by the server based on transaction note data, after the server performs an identity authentication on the target user based on the transaction note request and searches a predetermined security domain database for the transaction note data in response to a successful identity authentication.

At step 207, transaction note data in the transaction note file is displayed.

For the specific implementation of steps 201 to 207, reference can be made to the corresponding description of steps 101 to 103, which will not be repeated here.

At step 208, based on scoring and evaluation information and comment information of the target user regarding a stock transaction of a target stock, a first satisfaction level of the target user with respect to the stock transaction is calculated.

Optionally, calculating the first satisfaction level of the target user with respect to the stock transaction based on the scoring and evaluation information and the comment information of the target user regarding the stock transaction of the target stock includes: determining a first satisfaction index of the target user based on a scoring value or an evaluation level given by the target user for the stock transaction in the scoring and evaluation information; performing a semantic analysis on text comments in the comment information to obtain a semantic analysis result, and determining a second satisfaction index of the target user based on the semantic analysis result; and determining the first satisfaction level of the target user with respect to the stock transaction based on the first satisfaction index and the second satisfaction index.

The above-mentioned scoring and evaluation information may include the scoring value or the evaluation level given by the user for the stock transaction, and the comment information may include the text comments posted by the user and expressions used to express moods and emotions. In a specific implementation, the first satisfaction index of the user can be determined based on the scoring value or the evaluation level given by the user for the stock transaction, in such a manner that the higher the scoring value or the evaluation level, the higher the first satisfaction index. The semantic analysis can be performed on the text comments to obtain the semantic analysis result, which can include any one of the following: very satisfied, satisfied, average, dissatisfied, angry, etc. Then, the second satisfaction index of the user is determined based on the semantic analysis result. Next, the first satisfaction level of the user himself/herself for the target stock is determined based on the first satisfaction index and the second satisfaction index. For example, the first satisfaction level of the user can be determined in accordance with the following formula:

$$D1 = \sqrt{(Z1-x1)^2 + (Z2-x2)^2}/2*\rho.$$

Here, Z1 represents the first satisfaction index, Z2 represents the second satisfaction index, x1 represents a predetermined scoring or evaluation influence coefficient, x2 represents a predetermined comment influence coefficient, and ρ represents a predetermined satisfaction conversion coefficient. Values of the predetermined scoring or evaluation influence coefficient and the predetermined comment influence coefficient may be empirical values.

At step 209, a satisfaction level request is transmitted to the server; and an average satisfaction level regarding the stock transaction of the target stock fed back by the server is received. The average satisfaction level is an average value of all satisfaction levels counted by the server regarding at least one stock transaction of the target stock within a first predetermined time period.

The above average satisfaction level is an average value of satisfaction levels of at least one user conducting a stock transaction counted by the server within the first predetermined time period. In a specific implementation, the server may receive satisfaction levels reported by respective users, and then calculate an average value of at least one satisfaction level received within the first predetermined time period to obtain the average satisfaction level, so that the average satisfaction level of most users regarding the target stock can be obtained.

At step 210, a first recommendation value corresponding to the first satisfaction level is determined based on a predetermined mapping relation between satisfaction levels and recommendation values; and a second recommendation value corresponding to the average satisfaction level is determined based on the predetermined mapping relation between satisfaction levels and recommendation values.

The terminal device can predetermine the predetermined mapping relation between satisfaction levels and recommendation values, so that the first recommendation value corresponding to the first satisfaction level is determined in accordance with the mapping relation to indicate a recommendation satisfaction level corresponding to the target user, and the second recommendation value corresponding to the average satisfaction level is determined in accordance with the mapping relation to indicate a recommendation satisfaction level corresponding to most users.

At step 211, a target recommendation value is determined based on a first predetermined weight value corresponding to the first recommendation value, a second predetermined weight value corresponding to the second recommendation value, the first recommendation value, and the second recommendation value.

Optionally, determining the target recommendation value based on the first predetermined weight value corresponding to the first recommendation value, the second predetermined weight value corresponding to the second recommendation value, the first recommendation value and the second recommendation value includes: obtaining a first calculation result by calculating a product of the first recommendation value and the first weight value; obtaining a second calculation result by calculating a product of the second recommendation value and the second weight value; and determining the target recommendation value based on a sum of the first calculation result and the second calculation result.

The target recommendation value can be determined in accordance with the following formula:

Target recommendation value=First recommendation value*First weight value+Second recommendation value*Second weight value.

Here, the target recommendation value is a recommendation value obtained by combining the first satisfaction level of the target user for the target stock and the average satisfaction level of most users for the target stock, thereby avoiding too much subjectivity of the feeling of the target user. By using the average satisfaction level of most users regarding the target stock to balance the target recommendation value, the calculated target recommendation value can be more reasonable.

At step 212, when the target recommendation value is greater than a first predetermined value, at least one similar stock with a greater similarity to the target stock than a predetermined similarity is determined, and the at least one similar stock is recommended to the target user.

In a specific implementation, when the target recommendation value is greater than the first predetermined value, it indicates that the target stock is worth holding, so that another stock similar to the target stock can be further recommended to the target user. In this way, personalized stock recommendation to the target user is achieved, and a suitable stock can be recommended to the target user.

Optionally, the step 212 of determining the at least one similar stock with the greater similarity to the target stock than the predetermined similarity includes the following steps.

At step 121, a list of buyers of the target stock is obtained. The list of buyers includes at least one buyer, and the at least one buyer includes the target user.

At step 122, position information of the at least one buyer is obtained.

At step 123, at least one first similarity between position information of the at least one buyer other than the target user and position information of the target user is determined.

At step 124, target position information corresponding to a first similarity greater than a second predetermined value is determined.

At step 125, at least one candidate stock is extracted from the target position information.

At step 126, at least one second similarity between stock information of the at least one candidate stock and stock information of the target stock is determined.

At step 127, a second similarity greater than the predetermined similarity is determined, and a candidate stock corresponding to the second similarity is determined among the at least one candidate stock.

The position information may include at least one of the following: a stock name, a stock code, a position quantity, etc. The stock information may include at least one of the following: a stock price, a stock type, a transaction quantity, a stock run chart, etc.

Extracting the at least one candidate stock from the target position information may specifically include: extracting a candidate stock with a high number of occurrences from the target position information, or extracting a candidate stock with a high occurrence frequency from the target position information. For example, extracting the candidate stock with the high number of occurrences from the target position information may include: obtaining at least one number of occurrences by counting a number of occurrences of at least one stock in the target position information within a second predetermined time period; sorting the at least one occurrence number and determining a predetermined number of occurrence numbers at the top of the ranking; and determining candidate stock(s) corresponding to the predetermined number of occurrence numbers at the top of the ranking.

In a specific implementation, position information of other buyers who purchase the target stock can be obtained and determined, such as stock name, stock code, position quantity, etc. First similarities between the target user and other buyers regarding the position information can be determined, target position information is selected first based on magnitudes of the first similarities, and then at least one candidate stock is selected. At least one second similarity between the at least one candidate stock and the target stock regarding stock information can be determined, and at least one candidate stock is further selected based on the magnitude of the at least one second similarity. In this way, the position information of the buyers and the stock information of the stocks can be used to determine a similar stock with a higher similarity to the target stock for recommendation, and a more suitable stock can be recommend to the target user.

Optionally, the step 125 of extracting the at least one candidate stock from the target position information includes the following steps.

At step 251, at least one number of occurrences is obtained by counting a number of occurrences of at least one stock in the target position information within a second predetermined time period.

At step 252, at least one occurrence frequency is determined based on the at least one number of occurrences and the second predetermined time period.

At step 253, an occurrence frequency greater than a predetermined frequency threshold is selected, and at least one candidate stock corresponding to the occurrence frequency greater than the predetermined frequency threshold is determined.

The second predetermined time period can be set by the user, or can be set by default by the system. The second predetermined time period can be, for example, the last month or the last three months, which is not limited here. By counting the occurrence frequency of each candidate stock, at least one candidate stock with a higher occurrence frequency can be selected for recommendation to the target user.

As can be seen from the above, with the data display method described in the embodiments of the present disclosure applied in a terminal device, a first satisfaction level of the target user with respect to the stock transaction is calculated based on scoring and evaluation information and comment information of the target user regarding a stock transaction of a target stock; a satisfaction request is transmitted to the server; an average satisfaction level regarding the stock transaction of the target stock fed back by the server is received, the average satisfaction level being an average value of all satisfaction levels counted by the server regarding at least one stock transaction of the target stock within a first predetermined time period; a first recommendation value corresponding to the first satisfaction level is determined in accordance with a predetermined mapping relation between satisfaction levels and recommendation values; a second recommendation value corresponding to the average satisfaction level is determined in accordance with the predetermined mapping relation between satisfaction levels and recommendation values; a target recommendation value is determined, based on a first predetermined weight value corresponding to the first recommendation value, a second predetermined weight value corresponding to the second recommendation value, the first recommendation value and the second recommendation value; when the target recommendation value is greater than a first predetermined value, at least one similar stock with a greater similarity to the target stock than a predetermined similarity is determined, and the at least one similar stock is recommended to the target user. In this way, personalized stock recommendation can be realized for the target user and suitable stocks can be recommended to the target user.

Figure 3:
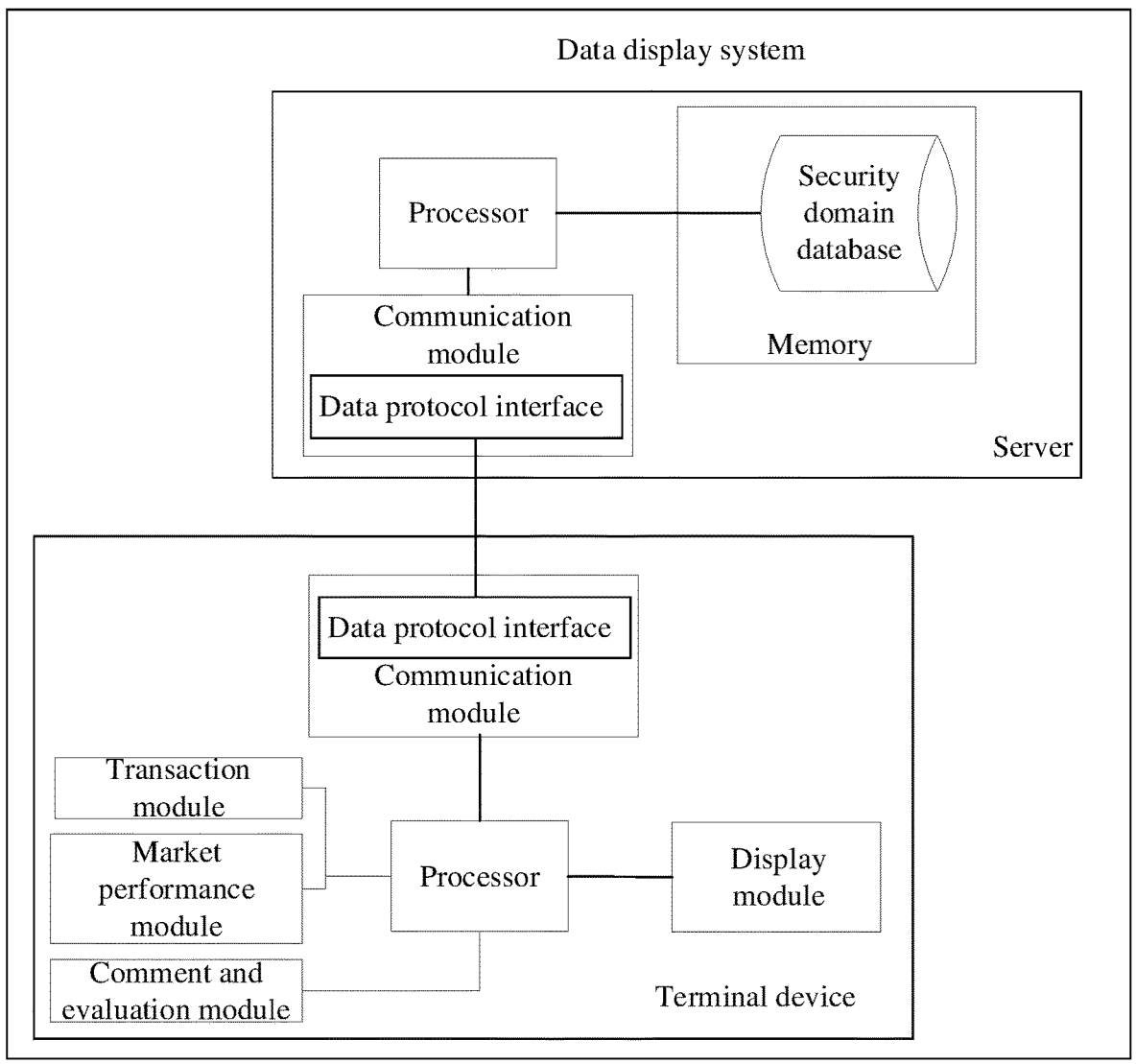
FIG. 3 is a schematic structural diagram of a data display system for implementing a data display method according to an embodiment of the present disclosure.

FIG. 3 is a system architecture diagram of a data display system for implementing a data display method according to an embodiment of the present disclosure. The data display system is part of a stock transaction system, and is configured to display data such as transaction data and transaction note generated in the stock transaction system. The data display system includes a terminal device and a server. The following operations can be implemented by the terminal device and the server. The terminal device includes a transaction module, a market performance module, a comment and evaluation module, a processor, a communication module. The server includes a communication module, a processor, and a memory which includes a security domain database. The communication modules are each provided with a data protocol interface, and the terminal device and the server can perform data transmission through the data protocol interface.

The processor of the terminal device can transmit a first data request to the transaction module, so as to collect a transaction type, a buy/sell direction, a stock name, a stock code, a transaction time, a transaction price, a transaction quantity and other stock transaction data in the transaction module. The processor may also transmit a second data request to the market performance module, so as to collect stock transaction data such as general market performance data and stock performance data in the market performance module. Scoring and evaluation information and comment information entered by the user may be obtained through the comment and evaluation module. Then, the processor can generate the transaction note data based on the stock transaction data, the scoring and evaluation information, and the comment information, serialize the transaction note data in accordance with a predetermined data protocol to obtain a first serialized data packet, and subsequently transmit the first serialized data packet to the server through the transmission module. The data protocol is a data serialization protocol, and may be, for example, a protocol buffer (PB) protocol. The PB protocol is a structured data storage format, whereby data memory can be saved and data transmission time can be shortened.

The first serialized data packet can carry identity information of the target user, and the processor of the server can perform an identity authentication on the identity information of the target user. If the identity authentication is passed, the first serialized data is stored in the security domain database through the communication module, so that the security of the transaction note data can be ensured. When the target user uses a stock trading application, the processor of the terminal device can control the transmission module to transmit a transaction note request of the target user to the server, the transaction note request carrying the identity information of the target user. The processor of the server can perform the identity authentication based on the identity information of the target user, and search the predetermined security domain database for transaction note data in response to a successful identity authentication. Specifically, the processor of the server generates a transaction note file based on the transaction note data in the first serialized data packet, and transmits the transaction note file to the terminal device through the communication module.

After the transmission module of the terminal device receives the transaction note file, the transaction note file can be parsed in accordance with the predetermined data protocol to obtain first de-serialized data, and at least one transaction note sub-file can be extracted from the first de-serialized data. The at least one transaction note sub-file includes transaction note data of at least one transaction note module.

Furthermore, the processor of the terminal device may determine at least one group of same-type note modules in the at least one transaction note sub-file, the same-type note modules including note modules of a same type from different transaction note sub-files; determine a first control type based on a data type of the same-type note modules; add at least one view control corresponding to at least one same-type note module in the at least one group of same-type note modules based on a view control template corresponding to the first control type; determine a second control type based on a data type of each of at least one non-same-type note module in at least one transaction note sub-file other than the at least one group of same-type note modules; add at least one view control corresponding to the at least one non-same-type note module based on at least one second control type; obtain at least one filled view control, by filling note data corresponding to each same-type note module of the at least one group of same-type note modules to the corresponding view control based on a filling order corresponding to the same-type note modules and filling note data corresponding to the non-same-type note module to the corresponding view control; stitch at least one filled view control corresponding to the at least one same-type note module of the at least one transaction note sub-file in accordance with a same positional relation; stitch the filled view control corresponding to the non-same-type note module with at least one stitched view control corresponding to at least one same-type note module belonging to a same transaction note sub-file, to obtain a transaction note view; and finally display the transaction note view on a user display interface through a display module. In this way, the terminal device can generate transaction note data based on transaction data, store the transaction note data through the server, and display the transaction note data by the terminal device. In addition, the user is enabled to review and summarize a transaction based on the transaction note data.

FIG. 4 is a schematic structural diagram of a data display apparatus according to an embodiment, which is applied in a terminal device. The data display apparatus according to the embodiment includes a transmitting unit 401, a receiving unit 402, and a display unit 403.

The transmitting unit 401 is configured to transmit a transaction note request of a target user to a server.

The receiving unit 402 is configured to receive a transaction note file fed back by the server. The transaction note file is generated by the server based on transaction note data, after the server performs an identity authentication on the target user based on the transaction note request and searches a predetermined security domain database for the transaction note data in response to a successful identity authentication.

The display unit 403 is configured to display transaction note data in the transaction note file.

Optionally, the transaction note file includes at least one transaction note sub-file, and the transaction note sub-file includes at least one note module. As for displaying the transaction note data in the transaction note file, the display unit 403 is specifically configured to: determine at least one group of same-type note modules in the at least one transaction note sub-file, the same-type note modules including note modules of a same type from different transaction note sub-files; determine a first control type based on a data type of the same-type note modules; add view controls corresponding to the same-type note modules based on a view control template corresponding to the first control type; determine a second control type based on a data type of a non-same-type note module in the at least one transaction note sub-file other than the at least one group of same-type note modules; add a view control corresponding to the non-same-type note module based on the second control type; obtain filled view controls, by filling note data corresponding to the same-type note modules to the view controls corresponding to the same-type note modules based on a filling order corresponding to the same-type note modules and filling note data corresponding to the non-same-type note module to the view control corresponding to the non-same-type note module; and generate a transaction note view based on the filled view controls, and display the transaction note view on a user interface.

Optionally, as for generating the transaction note view based on the at least one filled view control, the display unit 403 is specifically configured to: stitch at least one filled view control corresponding to at least one same-type note module of the at least one transaction note sub-file in accordance with a same positional relation; and stitch the filled view control corresponding to the non-same note module with at least one stitched view control corresponding to at least one same-type note module belonging to a same transaction note sub-file to obtain the transaction note view.

Figure 4A:
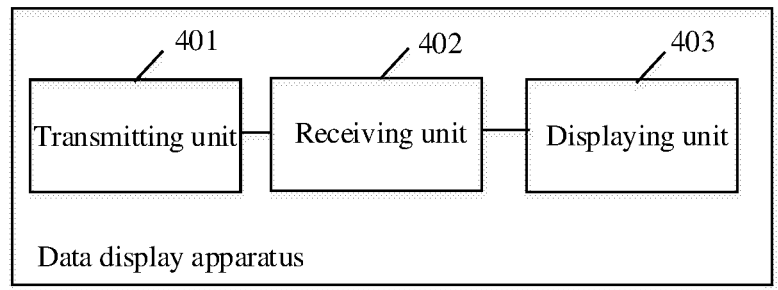
FIG. 4A is a schematic structural diagram of a data display apparatus according to an embodiment of the present disclosure.
Figure 4B:
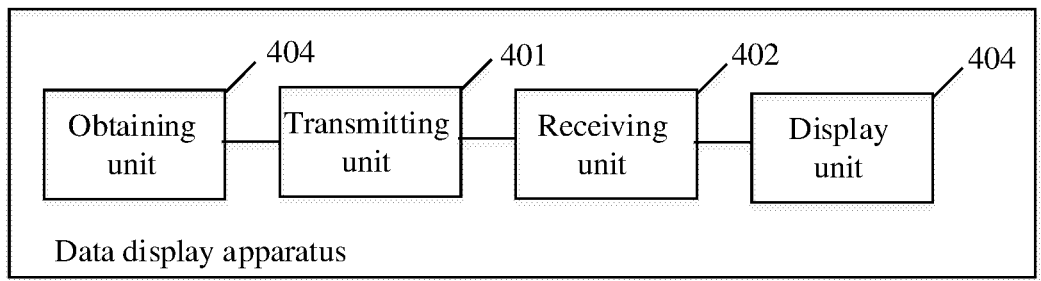
FIG. 4B is a block diagram illustrating functional units of another data display apparatus according to an embodiment of the present disclosure.

Optionally, compared with the data display apparatus shown in FIG. 4A, a variant structure thereof as shown in FIG. 4B may further include an obtaining unit 404.

Prior to transmitting the transaction note request of the target user to the server, the obtaining unit 404 is configured to: obtain a transaction data range of the target user; collect stock transaction data of the target user based on the transaction data range, the stock transaction data being transaction data generated by a stock transaction of the target user; and generate the transaction note data based on the stock transaction data. The transmitting unit is further configured to transmit the transaction note data to the server, the transaction note data being stored by the server in the security domain database after the server performs an identity authentication on the target user.

Optionally, subsequent to collecting the stock transaction data of the target user based on the transaction data range, the obtaining unit 404 is further configured to: collect scoring and evaluation information of scoring and evaluation performed by the target user on the stock transaction, and comment information of commenting performed by the target user on the stock transaction; and generate the transaction note data based on the stock transaction data, the scoring and evaluation information, and the comment information.

Optionally, the transaction data range includes a transaction time range and a stock target range. As for collecting the stock transaction data of the target user based on the transaction data range, the obtaining unit 404 is specifically configured to: obtain transaction data generated by a stock transaction of the target user within the transaction time range; and obtain from a stock transaction system a run chart related to the stock transaction in the stock target range.

Optionally, as for generating the transaction note data based on the stock transaction data, the obtaining unit 404 may be configured to extract key transaction data of a predetermined type from the stock transaction data as the transaction note data.

Optionally, as for extracting the key transaction data of the predetermined type from the stock transaction data as the transaction note data, the obtaining unit 404 may be further configured to: perform a statistic analysis, calculation, or merging operation on the key transaction data to obtain the transaction note data.

Figure 4C:
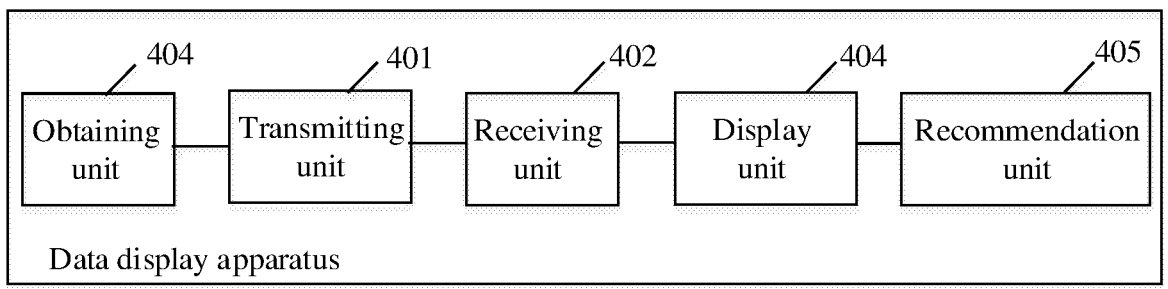
FIG. 4C is a block diagram illustrating functional units of a further data display apparatus according to an embodiment of the present disclosure.

Optionally, compared with the data display apparatus shown in FIG. 4B, a variant structure thereof as shown in FIG. 4C may further include a recommendation unit 405. The recommendation unit 405 is configured to: calculate, based on scoring and evaluation information and comment information of the target user regarding a stock transaction of a target stock, a first satisfaction level of the target user with respect to the stock transaction; transmit a satisfaction request to the server; receive an average satisfaction level regarding the stock transaction of the target stock fed back by the server, the average satisfaction level being an average value of all satisfaction levels counted by the server regarding at least one stock transaction of the target stock within a first predetermined time period; determine a first recommendation value corresponding to the first satisfaction level in accordance with a predetermined mapping relation between satisfaction levels and recommendation values; determine a second recommendation value corresponding to the average satisfaction level in accordance with the predetermined mapping relation between satisfaction levels and recommendation values; determine a target recommendation value based on a first predetermined weight value corresponding to the first recommendation value, a second predetermined weight value corresponding to the second recommendation value, the first recommendation value and the second recommendation value; and determine, when the target recommendation value is greater than a first predetermined value, at least one similar stock with a greater similarity to the target stock than a predetermined similarity, and recommend the at least one similar stock to the target user.

Optionally, as for determining the at least one similar stock with the greater similarity to the target stock than the predetermined similarity, the recommendation unit 405 is specifically configured to: obtain a list of buyers of the target stock, the list of buyers including at least one buyer, the at least one buyer including the target user; obtain position information of the at least one buyer; determine at least one first similarity between position information of the at least one buyer other than the target user and position information of the target user; determine target position information corresponding to a first similarity greater than a second predetermined value; extract at least one candidate stock from the target position information; determine at least one second similarity between the stock information of the at least one candidate stock and stock information of the target stock; and determine a second similarity greater than the predetermined similarity, and determine a candidate stock corresponding to the second similarity among the at least one candidate stock.

Optionally, as for extracting the at least one candidate stock from the target position information, the recommendation unit 405 is specifically configured to: obtain at least one number of occurrences by counting a number of occurrences of at least one stock in the target position information within a second predetermined time period; determine at least one occurrence frequency based on the at least one number of occurrences and the second predetermined time period; and select an occurrence frequency greater than a predetermined frequency threshold, and determine at least one candidate stock corresponding to the occurrence frequency greater than the predetermined frequency threshold.

Optionally, as for calculating, based on the scoring and evaluation information and the comment information of the target user regarding the stock transaction of the target stock, the first satisfaction level of the target user with respect to the stock transaction, the recommendation unit 405 may be configured to: determine a first satisfaction index of the target user based on a scoring value or an evaluation level given by the target user for the stock transaction in the scoring and evaluation information; perform a semantic analysis on text comments in the comment information to obtain a semantic analysis result, and determine a second satisfaction index of the target user based on the semantic analysis result; and determine the first satisfaction level of the target user with respect to the stock transaction based on the first satisfaction index and the second satisfaction index.

Optionally, as for determining the target recommendation value based on the first predetermined weight value corresponding to the first recommendation value, the second predetermined weight value corresponding to the second recommendation value, the first recommendation value and the second recommendation value, the recommendation unit 405 may be configured to: obtain a first calculation result by calculating a product of the first recommendation value and the first weight value; obtain a second calculation result by calculating a product of the second recommendation value and the second weight value; and determine the target recommendation value based on a sum of the first calculation result and the second calculation result.

An embodiment of the present disclosure further provides a terminal device, including one or more processors, a memory, a communication interface, and one or more programs. The one or more programs are stored in the memory and are configured to be executed by the processors, and the programs include instructions configured to implement some or all steps of any method described in the above method embodiments.

An embodiment of the present disclosure further provides a computer storage medium. The computer storage medium stores a computer program for electronic data exchange. The computer program causes a computer to implement some or all steps of any method described in the above method embodiments. The computer includes a terminal device or a server.

An embodiment of the present disclosure further provides a computer program product. The computer program product includes a non-transitory computer-readable storage medium having a computer program stored thereon, and the computer program is operable to cause a computer to implement some or all steps of any method described in the above method embodiments. The computer program product may be a software installation package, and the computer includes a terminal device or a server.

It should be noted that, for the ease of description, the foregoing method embodiments are all expressed as combinations of series of actions. However, those skilled in the art should know that the present disclosure is not limited by the described sequence of actions, because according to the present disclosure, some steps can be implemented in another order or at the same time. Secondly, those skilled in the art should also know that the embodiments described in the specification are all preferred embodiments, and the actions and modules involved are not necessarily required by the present disclosure.

In the above embodiments, the description of each embodiment has its own emphasis. For parts that are not described in detail in an embodiment, reference may be made to related descriptions of other embodiments.

In the several embodiments provided in the present disclosure, it should be understood that the disclosed apparatus may be implemented in other ways. For example, the apparatus embodiments described above are merely illustrative. For example, the division of the above-mentioned units is only a logical function division, and there may be other divisions in actual implementation. For example, a plurality of units or components can be combined or integrated to another system, or some features can be ignored or not implemented. In addition, the displayed or discussed mutual coupling or direct coupling or communication connection between apparatuses or units may be indirect coupling or communication connection through some interfaces, and may be electrical or in other forms.

The units described above as separate components may or may not be physically separated, and the components shown as units may or may not be physical units. That is, they may be located in one place, or distributed over a plurality of network units. Some or all units may be selected based on actual needs to achieve the objectives of the solutions of the embodiments.

In addition, the functional units in the various embodiments of the present disclosure may be integrated into one processing unit, or each unit may exist alone physically, or two or more units may be integrated into one unit. The above-mentioned integrated unit can be implemented in the form of hardware or of software functional unit(s).

If the above integrated unit is implemented in the form of software functional unit(s) and sold or used as an independent product, it can be stored in a computer readable memory. Based on this understanding, the technical solutions of the present disclosure essentially or the part thereof that contributes to the existing technology or all or part of the technical solutions can be embodied in the form of a software product. The computer software product is stored in a memory, and includes a number of instructions which cause a computer device (which may be a personal computer, a server, or a network device, etc.) to implement all or some steps of the foregoing methods of the various embodiments of the present disclosure. The aforementioned memory includes: a Universal Serial Bus (USB) disk, a read-only memory (ROM), a random access memory (RAM), a mobile hard disk, a magnetic disk, a compact disc or other media that can store program codes.

Those of ordinary skill in the art can understand that all or some steps in the various methods of the above-described embodiments can be implemented by a program instructing relevant hardware. The program can be stored in a computer-readable memory, and the memory can include: a flash disk, a ROM, a RAM, a magnetic disk or a compact disc, etc.

The embodiments of the present disclosure are described in detail above, and specific examples are used in the specification to illustrate the principles and implementations of the present disclosure. The description of the above embodiments is only used to help understand the methods and core ideas of the present disclosure. At the same time, based on the ideas of the present disclosure, persons of ordinary skill in the art will conceive modifications to the specific implementations and the application scope. In summary, the content of this specification should not be construed as a limitation on the present disclosure.

What is claimed is:

1. A data display method, applied in a terminal device, the method comprising:

controlling, by a processor of the terminal device, a transceiver of the terminal device to transmit a transaction note request of a target user to a server;

controlling, by the processor of the terminal device, the transceiver of the terminal device to receive a serialized transaction note file fed back by the server, and de-serializing, by the processor of the terminal device in accordance with a predetermined data protocol, the serialized transaction note file to obtain a transaction note file, wherein the transaction note file is generated by the server based on transaction note data after the server performs an identity authentication on the target user based on the transaction note request and searches a predetermined security domain database for the transaction note data in response to a successful identity authentication, and wherein the transaction note data comprises transaction data of the target user, scoring and evaluation information of scoring and evaluation performed by the target user on a transaction, and comment information of commenting performed by the target user on the transaction;

determining, by the processor of the terminal device, control types based on data types of transaction note data in the transaction note file, adding and filling view controls based on the determined control types, generating a transaction note view based on the filled view controls, and controlling a display of terminal device to display the transaction note view on a user interface so as to display transaction note data in the transaction note file; and calculating, by the processor of the terminal device based on scoring and evaluation information and comment information of the target user regarding a transaction of a target transaction object, a first satisfaction level of the target user with respect to the transaction of the target transaction object, and determining a target recommendation value based on the first satisfaction level and an average satisfaction level of a plurality of users regarding the transaction of the target transaction object fed back by the server and received by the transceiver of the terminal device, wherein the target recommendation value is used to determine other transaction objects similar to the target transaction object and to be recommended to the target user; and controlling, by the processor of the terminal device, the display of the terminal device to display on the user interface the determined other transaction objects similar to the target transaction object and to be recommended to the target user.

2. The method according to claim 1, wherein the transaction note file comprises at least one transaction note sub-file comprising at least one note module, and wherein said displaying the transaction note data in the transaction note file comprises:

determining at least one group of same-type note modules in the at least one transaction note sub-file, wherein the same-type note modules comprise note modules of a same type from different transaction note sub-files;

determining a first control type based on a data type of the same-type note modules;

adding view controls corresponding to the same-type note modules based on a view control template corresponding to the first control type;

determining a second control type based on a data type of a non-same-type note module in the at least one transaction note sub-file other than the at least one group of same-type note modules;

adding a view control corresponding to the non-same-type note module based on the second control type;

obtaining filled view controls by filling note data corresponding to the same-type note modules to the view controls corresponding to the same-type note modules based on a filling order corresponding to the same-type note modules and filling note data corresponding to the non-same-type note module to the view control corresponding to the non-same-type note module; and generating a transaction note view based on the filled view controls, and displaying the transaction note view on a user interface.

3. The method according to claim 1, further comprising, prior to said transmitting the transaction note request of the target user to the server:

obtaining a transaction data range of the target user;

collecting the transaction data of the target user based on the transaction data range, wherein the transaction data is transaction data generated by a transaction of the target user;

generating the transaction note data based on the transaction data; and transmitting the transaction note data to the server, wherein the transaction note data is stored by the server in the security domain database after the server performs the identity authentication on the target user.

4. The method according to claim 3, further comprising, subsequent to said collecting the transaction data of the target user based on the transaction data range:

collecting the scoring and evaluation information of scoring and evaluation performed by the target user on the transaction and the comment information of commenting performed by the target user on the transaction; and generating the transaction note data based on the transaction data, the scoring and evaluation information, and the comment information.

5. The method according to claim 3, wherein the transaction data range comprises a transaction time range and a target transaction object range, and said collecting the transaction data of the target user based on the transaction data range comprises:

obtaining transaction data generated by a transaction of the target user within the transaction time range; and obtaining from a transaction system a run chart related to the transaction in the target transaction object range.

6. The method according to claim 4, wherein said calculating, based on the scoring and evaluation information and the comment information of the target user regarding the transaction of the target transaction object, the first satisfaction level of the target user with respect to the transaction, and determining the target recommendation value based on the first satisfaction level and the average satisfaction level regarding the transaction of the target transaction object fed back by the server comprises:

calculating, based on the scoring and evaluation information and the comment information of the target user regarding the transaction of the target transaction object, the first satisfaction level of the target user with respect to the transaction;

transmitting a satisfaction level request to the server;

receiving the average satisfaction level regarding the transaction of the target transaction object fed back by the server, wherein the average satisfaction level is an average value of all satisfaction levels counted by the server regarding at least one transaction of the target transaction object within a first predetermined time period;

determining a first recommendation value corresponding to the first satisfaction level in accordance with a predetermined mapping relation between satisfaction levels and recommendation values;

determining a second recommendation value corresponding to the average satisfaction level in accordance with the predetermined mapping relation between the satisfaction levels and the recommendation values;

determining the target recommendation value based on a first predetermined weight value corresponding to the first recommendation value, a second predetermined weight value corresponding to the second recommendation value, the first recommendation value, and the second recommendation value; and determining, when the target recommendation value is greater than a first predetermined value, at least one similar transaction object with a greater similarity to the target transaction object than a predetermined similarity, and recommending the at least one similar transaction object to the target user.

7. The method according to claim 6, wherein said determining the at least one similar transaction object with the greater similarity to the target transaction object than the predetermined similarity comprises:

obtaining a list of buyers of the target transaction object, wherein the list of buyers comprises at least one buyer, and the at least one buyer comprises the target user;

obtaining position information of the at least one buyer;

determining at least one first similarity between position information of the at least one buyer other than the target user and position information of the target user;

determining target position information corresponding to a first similarity greater than a second predetermined value;

extracting at least one candidate transaction object from the target position information;

determining at least one second similarity between transaction object information of the at least one candidate transaction object and transaction object information of the target transaction object; and determining a second similarity greater than the predetermined similarity, and determining a candidate transaction object corresponding to the second similarity among the at least one candidate transaction object.

8. The method according to claim 7, wherein said extracting the at least one candidate transaction object from the target position information comprises:

obtaining at least one number of occurrences by counting a number of occurrences of at least one transaction object in the target position information within a second predetermined time period;

determining at least one occurrence frequency based on the at least one number of occurrences and the second predetermined time period; and selecting an occurrence frequency greater than a predetermined frequency threshold, and determining at least one candidate transaction object corresponding to the occurrence frequency greater than the predetermined frequency threshold.

9. The method according to claim 6, wherein said calculating, based on the scoring and evaluation information and the comment information of the target user regarding the transaction of the target transaction object, the first satisfaction level of the target user with respect to the transaction comprises:
  determining a first satisfaction index of the target user based on a scoring value or an evaluation level given by the target user for the transaction in the scoring and evaluation information;
  performing a semantic analysis on text comments in the comment information to obtain a semantic analysis result, and determining a second satisfaction index of the target user based on the semantic analysis result; and
  determining the first satisfaction level of the target user with respect to the transaction based on the first satisfaction index and the second satisfaction index.

10. The method according to claim 6, wherein said determining the target recommendation value based on the first predetermined weight value corresponding to the first recommendation value, the second predetermined weight value corresponding to the second recommendation value, the first recommendation value, and the second recommendation value comprises:
  obtaining a first calculation result by calculating a product of the first recommendation value and the first weight value;
  obtaining a second calculation result by calculating a product of the second recommendation value and the second weight value; and
  determining the target recommendation value based on a sum of the first calculation result and the second calculation result.

11. The method according to claim 3, wherein said generating the transaction note data based on the transaction data comprises:
  extracting key transaction data of a predetermined type from the transaction data as the transaction note data.

12. The method according to claim 11, wherein said extracting the key transaction data of the predetermined type from the transaction data as the transaction note data further comprises:
  performing a statistic analysis, calculation or merging operation on the key transaction data, to obtain the transaction note data.

13. The method according to claim 2, wherein said generating the transaction note view based on the at least one filled view control comprises:
  stitching at least one filled view control corresponding to at least one same-type note module of the at least one transaction note sub-file in accordance with a same positional relation; and
  stitching the filled view control corresponding to the non-same-type note module with at least one stitched view control corresponding to at least one same-type note module belonging to a same transaction note sub-file, to obtain the transaction note view.

14. A data display apparatus, applied in a terminal device, the apparatus comprises:
  a transmitting unit configured to transmit a transaction note request of a target user to a server;
  a receiving unit configured to receive a serialized transaction note file fed back by the server, wherein the transaction note file is generated by the server based on transaction note data after the server performs an identity authentication on the target user based on the transaction note request and searches a predetermined security domain database for the transaction note data in response to a successful identity authentication, and wherein the transaction note data comprises transaction data of the target user, scoring and evaluation information of scoring and evaluation performed by the target user on a transaction, and comment information of commenting performed by the target user on the transaction;
  a processing unit configured to de-serialize, in accordance with a predetermined data protocol, the serialized transaction note file to obtain a transaction note file, and to determine control types based on data types of transaction note data in the transaction note file, add and fill view controls based on the determined control types, and generate a transaction note view based on the filled view controls;
  a display unit configured to display the transaction note view on a user interface so as to display transaction note data in the transaction note file; and
  a recommendation unit configured to calculate, based on scoring and evaluation information and comment information of the target user regarding a transaction of a target transaction object, a first satisfaction level of the target user with respect to the transaction of the target transaction object, and configured to determine a target recommendation value based on the first satisfaction level and an average satisfaction level of a plurality of users regarding the transaction of the target transaction object fed back by the server and received by the receiving unit of the terminal device, wherein the target recommendation value is used to determine other transaction objects similar to the target transaction object and to be recommended to the target user,
  wherein the display unit is further configured to display on the user interface the determined other transaction objects similar to the target transaction object and to be recommended to the target user.

15. A terminal device, comprising:
one or more processors; and
a memory configured to store one or more programs,
wherein the one or more programs, when executed by the one or more processors, cause the one or more processors to implement the method according to claim 1.

16. A non-transitory computer-readable storage medium, having a computer program for electronic data exchange stored thereon, wherein the computer program causes a computer to implement the method according to claim 1.

* * * * *